(12) United States Patent
Stewart et al.

(10) Patent No.: US 11,656,874 B2
(45) Date of Patent: May 23, 2023

(54) ASYMMETRICAL PROCESSOR MEMORY ARCHITECTURE

(71) Applicant: NXP Canada Inc., Toronto (CA)

(72) Inventors: Malcolm Douglas Stewart, Ottawa (CA); Daniel Claude Laroche, Kemptville (CA); Trevor Graydon Burton, Gloucester (CA); Ali Osman Ors, Ottawa (CA)

(73) Assignee: NXP USA, Inc., Austin, TX (US)

( * ) Notice: Subject to any disclaimer, the term of this patent is extended or adjusted under 35 U.S.C. 154(b) by 788 days.

(21) Appl. No.: 14/878,474

(22) Filed: Oct. 8, 2015

(65) Prior Publication Data
US 2016/0103784 A1    Apr. 14, 2016

Related U.S. Application Data

(60) Provisional application No. 62/061,335, filed on Oct. 8, 2014.

(51) Int. Cl.
*G06F 9/30* (2018.01)
*G06F 15/80* (2006.01)

(52) U.S. Cl.
CPC ........ *G06F 9/30196* (2013.01); *G06F 9/3004* (2013.01); *G06F 9/30036* (2013.01); *G06F 15/8061* (2013.01)

(58) Field of Classification Search
CPC . G06F 9/30196; G06F 9/30036; G06F 9/3004
See application file for complete search history.

(56) References Cited

U.S. PATENT DOCUMENTS

| | | | | |
|---|---|---|---|---|
| 5,303,200 A | * | 4/1994 | Elrod | G11C 7/1006 365/230.05 |
| 5,603,055 A | * | 2/1997 | Evoy | G06F 9/4403 710/10 |
| 8,510,534 B2 | * | 8/2013 | Van Berkel | G06F 9/30025 712/3 |

* cited by examiner

*Primary Examiner* — Corey S Faherty

(57) ABSTRACT

An asymmetrical processing system is provided. The processor has a vector unit comprised of one or more computational units coupled with a vector memory space and a scalar unit coupled with a data memory space and the vector memory space, the scalar unit accessing one or more memory locations within the vector memory space.

17 Claims, 10 Drawing Sheets

| 202-1<br>VM1 | 202-2<br>VM2 | 202-3<br>VM3 | 202-4<br>VM4 | ... | 202-8<br>VM8 |
|---|---|---|---|---|---|
| 0 | 1 | 2 | 3 | ... | 7 |
| 8 | 9 | 10 | 11 | ... | 15 |
| ... | ... | ... | ... | ... | ... |
| 2048 | 2049 | 2050 | ... | ... | ... |
| ... | ... | ... | ... | ... | ... |
| 32,760 | 32,761 | 32,762 | ... | ... | 32,767 |

ASYMMETRICAL PROCESSOR MEMORY ARCHITECTURE

TECHNICAL FIELD

The present disclosure relates to a processor with the ability to issue vector and scalar instructions concurrently.

BACKGROUND

Single instruction multiple data (SIMD) processors may include a scalar processing unit as well as one or more vector processing units that can execute an instruction on multiple pieces of information at once. The use of a vector processing unit can provide improved processing efficiencies particularly when the vector processing capability is matched to the processing task provided. The different processing units may each be associated with their own respective memory space for storing data to be processed. If data is required to be acted upon by the scalar processing unit and one or more of the vector processing units, the data must be transferred between the respective memory spaces.

It may be desirable to provide a processor capable of efficiently accessing data by both a scalar processing unit and at least one vector processing unit.

BRIEF DESCRIPTION OF THE DRAWINGS

The foregoing and other advantages of the disclosure will become apparent upon reading the following detailed description and upon reference to the drawings.

FIG. 4 is an example 32 KB memory space addressed in column mode;

Figure 1:
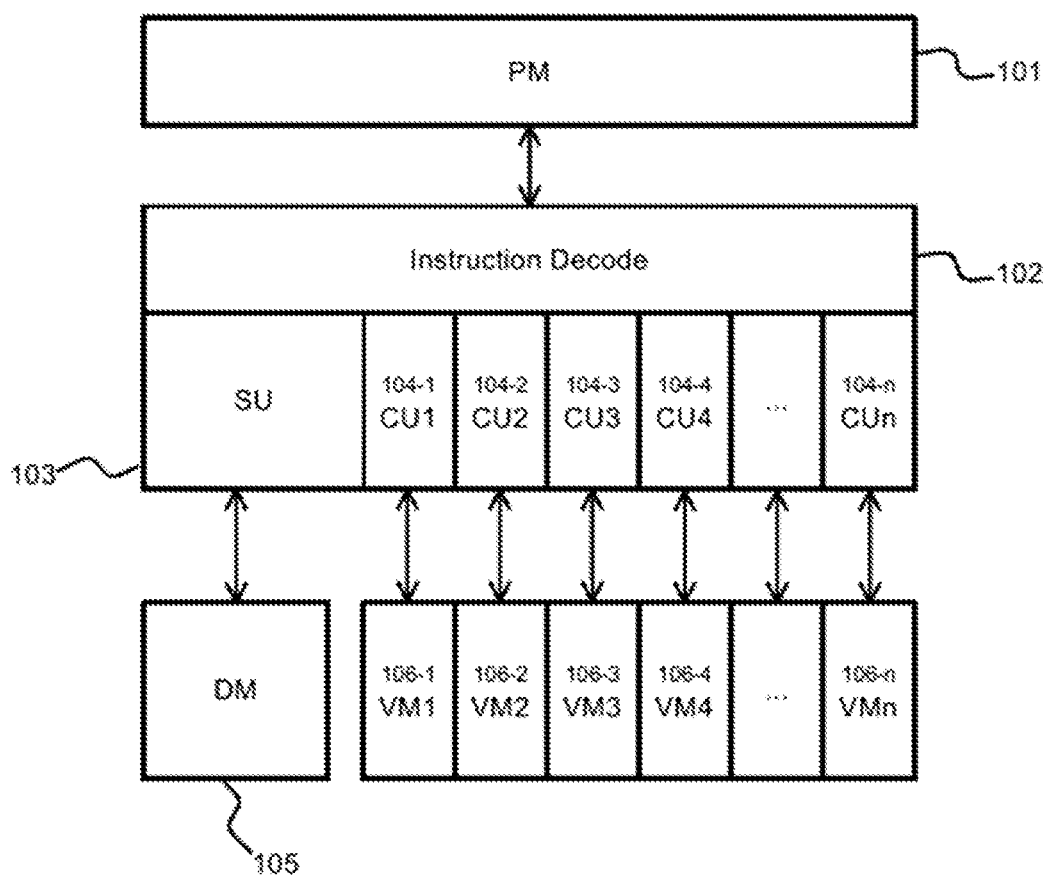
FIG. 1 depicts an asymmetrical processor.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the description and appended claims.

DETAILED DESCRIPTION

In accordance with the present disclosure there is provided an asymmetrical processing system comprising: a vector unit comprised of one or more computational units coupled with a vector memory space; and a scalar unit coupled with a data memory space and the vector memory space, the scalar unit accessing one or more memory locations within the vector memory space.

In a further embodiment of the asymmetrical processing system, the data memory space and vector memory space is contiguous.

In a further embodiment of the asymmetrical processing system, the scalar unit accesses the data memory space and vector memory space concurrently.

In a further embodiment of the asymmetrical processing system, the scalar unit accesses the data memory space and the one or more computational units access the vector memory space concurrently.

In a further embodiment, the asymmetrical processing system further comprises: a program memory space storing instructions for the scalar unit and vector unit; and instruction decode logic for decoding an instruction retrieved from the program memory space.

In a further embodiment of the asymmetrical processing system, the scalar unit and the vector unit operate on a decoded instruction in parallel.

In a further embodiment, the asymmetrical processing system further comprises a configurable memory access mode to determine a slice or a column memory access mode.

In a further embodiment of the asymmetrical processing system, the access mode is determined by access bits or register bits.

In a further embodiment of the asymmetrical processing system, the scalar unit accesses the vector memory in slice mode across a plurality of vector memory locations each associated with one of the one or more computational units.

In a further embodiment of the asymmetrical processing system, the scalar unit accesses the vector memory in column mode wherein a vector memory location associated with one of the one or more computational units is accessed.

In a further embodiment of the asymmetrical processing system, the vector memory is divided into a plurality of sub-blocks allowing the scalar unit to access the sub-blocks concurrently.

In a further embodiment of the asymmetrical processing system, only a portion of the vector memory is accessible by the scalar unit.

In a further embodiment of the asymmetrical processing system, the portion of vector memory is defined by a predetermined threshold.

In a further embodiment of the asymmetrical processing system, the scalar unit accesses the data memory space and a plurality of vector memory space concurrently.

In a further embodiment of the asymmetrical processing system, the scalar unit accesses the data memory space, a plurality of vector memory space, and the one or more computational units access the vector memory space.

In a further embodiment of the asymmetrical processing system, the vector memory space is allocated in software.

In a further embodiment of the asymmetrical processing system, the vector memory space is hard coded.

In a further embodiment of the asymmetrical processing system, the memory access method is determined at start up of the processing system.

In accordance with the present disclosure there is further provided a method for accessing memory by a scalar unit of an asymmetrical processing system comprising: determining data memory ranges associated in a data memory space with vector memory of one or more computational units associated with a vector unit each computational unit having an associated range of memory locations in the vector memory; initiating an access to memory location associated with vector memory; determining a memory location in vector memory; accessing data in the vector memory location; and wherein a vector unit can concurrently access the vector memory location with the scalar unit.

In a further embodiment of the method, the scalar unit has memory allocated in the data memory space reserved from the vector memory.

In a further embodiment of the method, the data memory space and vector memory space is contiguous.

In a further embodiment of the method, the scalar unit accesses the data memory space and vector memory space concurrently.

In a further embodiment of the method, the scalar unit accesses the data memory space and the one or more computational units access the vector memory space concurrently.

In a further embodiment, the method further comprises a configurable memory access mode to determine a slice or a column memory access mode.

In a further embodiment of the method, the access mode is determined by access bits or register bits.

In a further embodiment of the method, the scalar unit accesses the vector memory in slice mode across a plurality of vector memory locations each associated with one of a plurality of computational units.

In a further embodiment of the method, the scalar unit accesses the vector memory in column mode wherein a vector memory location associated with one of a plurality of computational units is accessed.

In a further embodiment of the method, the vector memory is divided into a plurality of sub-blocks allowing the scalar unit to access the sub-blocks concurrently.

In a further embodiment of the method, only a portion of the vector memory is accessible by the scalar unit.

In a further embodiment of the method, the portion of vector memory is defined by a predetermined threshold.

In a further embodiment of the method, the scalar unit accesses the data memory space and a plurality of vector memory space concurrently.

In a further embodiment of the method, the scalar unit accesses the data memory space, a plurality of vector memory space, and the one or more computational units access the vector memory space.

In a further embodiment of the method, the vector memory space is allocated in software.

In a further embodiment of the method, the vector memory space is hard coded.

In a further embodiment of the method, the memory access method is determined at start up.

The foregoing and additional aspects and embodiments of the present disclosure will be apparent to those of ordinary skill in the art in view of the detailed description of various embodiments and/or aspects, which is made with reference to the drawings, a brief description of which is provided next.

An asymmetrical processor is capable of efficiently processing asymmetrical data types, vector and scalar, in parallel or sequentially in the same memory space. The processor comprises a Scalar Unit (SU) 103 and one or more computational units (CU) 104-1 . . . 104-n (referred to collectively as CUs 104) as shown in FIG. 1. The SU and CUs share program memory (PM) 101 and instruction decode (ID) logic 102, and operate in parallel. The CUs 104 and SU 103 are generally separate processor engines with separate memory spaces, and the CUs 104 and SU 103 can access their separate memory spaces concurrently, which require data to be moved from the vector unit memory (VM) 106-1 . . . 106-n to the scalar unit memory, also referred to as data memory (DM) 105 or vice versa. The different processors may not even be on the same silicon die.

An example application for an asymmetrical processor is image processing is a sequence that uses scalar and vector processing alternatively. When the function involves large quantities of data movement back and forth between vector and scalar processors, a lot of time and power is spent moving data between DM 105 and VM 106-1 . . . 106-n which slows down the processing.

When memory requirements are greater than memory available external memory access is required. An example sequence of events could be:

Load CU data from external memory
Process using CUs
Store to external memory
Load SU data from external memory
Process using SU
Store to external memory
Load CU data from external memory
etc . . .

The resulting data moves are time and power consuming thereby removing time and resources away from the processing functions. If a lot of data movement is required the limiting factor in a design might not be the (processing power)/(processing budget) or (MHz)/mW but the time/power (sec/mW) it takes to do the data movement. Thus, there is a need to reduce data movement when performing processing functions. One approach is to increase the memory bandwidth by increasing the data width or by using a newer/faster memory, however, it is not scalable.

Figure 2:
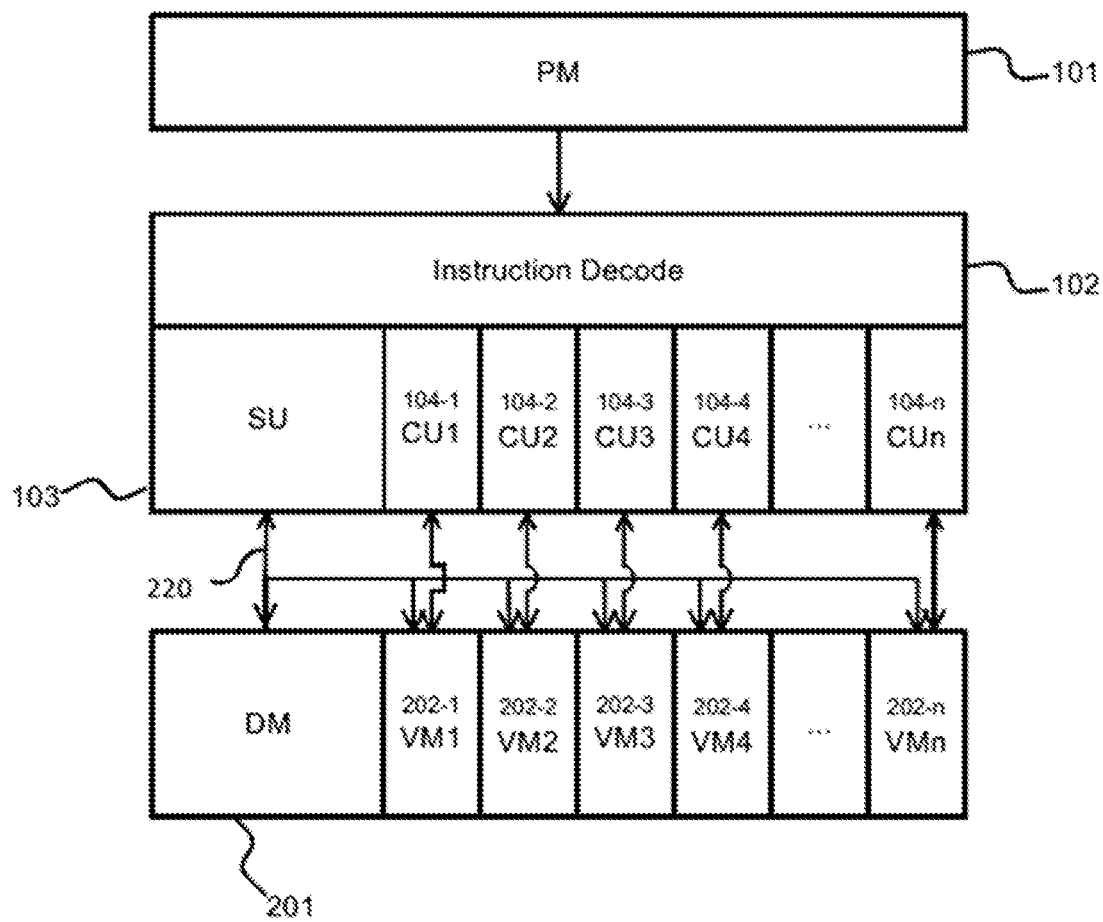
FIG. 2 depicts a system with contiguous data memory (DM) and vector memory (VM)

In the embodiment shown in FIG. 2 the SU 103 has a direct connection to both contiguous data memory (DM) 201 and vector memory (VM)202-1.202-n using a single memory port 220. The SU 103 can fully access all of the memory spaces.

The PM space 101 is shared by both vector 104 and scalar units 103. FIG. 2 shows the connection between the PM 101 and the shared instruction decode block 102 that controls the SU 103 and CUs 104. The program memory is typically a multiple of 32-bits wide but it can be larger or smaller as required by one's instruction encoding.

The DM space 201 is the area of memory that is addressable by the scalar processor 103. In the embodiment, the SU 103 has its own dedicated memory space and the ability to directly access the VM 202-1.202-n via a memory port 220. When the SU 103 and one of the CUs 104 attempt to address the same space in the VM 202, arbitration is used to provide access. To improve concurrent access to VM 202, the VM 202 can be split into multiple separate memories. For example, with 4 KB per each of the CUs 104, the SU 103 and CUs 104 can access two blocks of 2 KB memories or four blocks of 1 KB memories concurrently. Because the VM 202 is broken into two or four or more sub-blocks, this implementation also allows the CUs 104 to perform a double, quadruple or multiple load from VM 202 in relation to the number of sub-blocks used.

The VM space 202-1 . . . 202-n is only the memory space associated with each of the CUs 104. It may be addressed in Single instruction, multiple data (SIMD) fashion (all get the same address) or with a vector address where each CU 104 can index separately into its own memory space. In the embodiment described herein, the SU 103 and CUs 104 operate on the data without having to move it in to or out of the processor or on/off chip. Further, the asymmetrical processor architecture allows both scalar and vector processing to be executed in parallel, or sequentially using the same memory space.

As another embodiment, separate scalar and vector processors can be used as opposed to single asymmetrical processor acting on the same memory space.

Reducing data movement in and out of a processor(s) system can maximize the efficiency of both the processor and the memory bandwidth. By reducing the on/off chip data movement the efficiency of the memory interface and on-chip bus is optimized.

Figure 3:
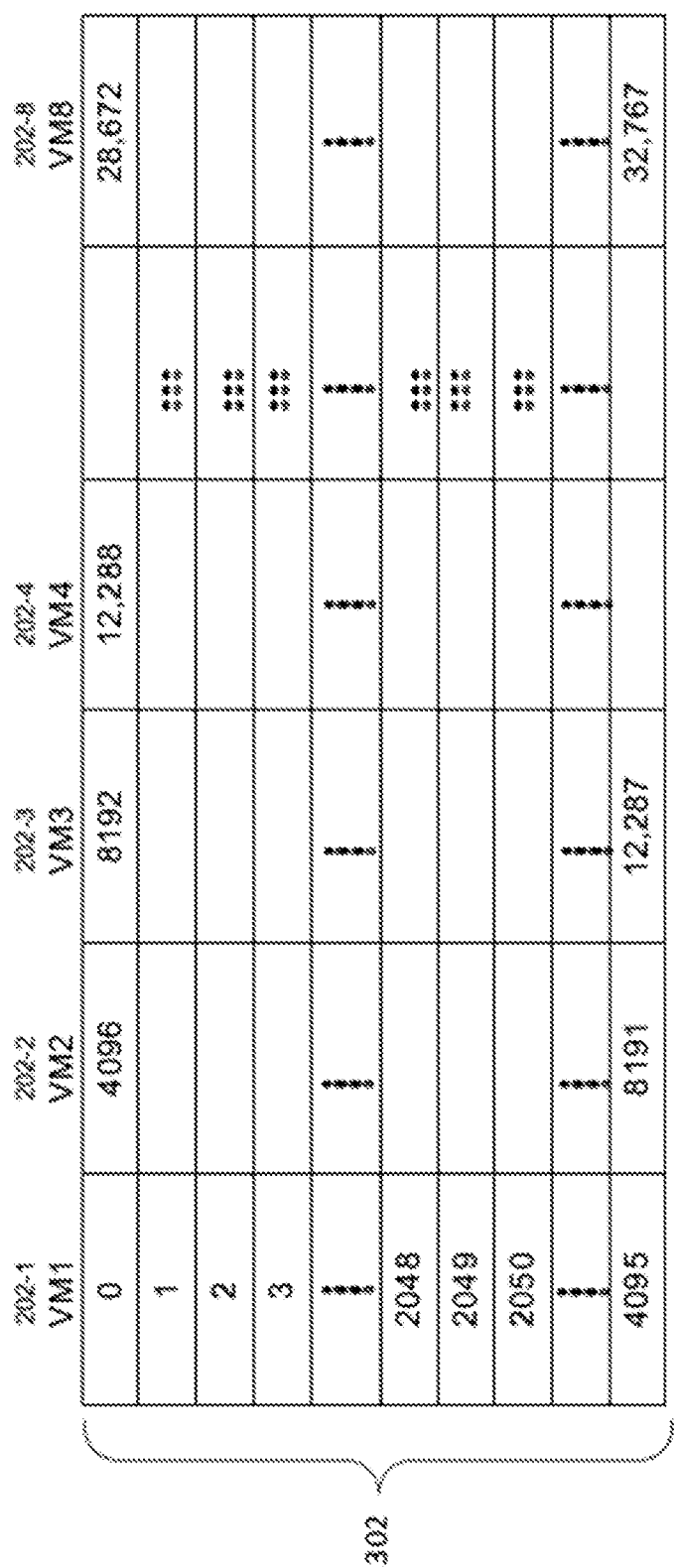
FIG. 3 is an example 32 Kilo Byte (KB) memory space addressed in slice mode.

The SU 103 can access the vector memory 202-1 . . . 202-n in column mode. As an example with a 32 KB memory space and eight vector memory, referring to FIG. 3, the SU 103 accesses one VM 202 block 302 at a time, e.g. 0-4K for VM1 202-1, 4K-8K for VM2 202-2, 8K-12K for VM3 202-3, etc. . . . Extending to n VM, the end address 302 would be ((n*depth)−1), where depth is the depth of the memory address. As would be apparent the size of the address space at each location can vary depending on the implementation.

As another embodiment, the SU 103 can access the vector memory 202-1 . . . 202-n in slice mode 402. Referring to FIG. 4 which provides an example with 8 CUs and 32 KB memory, the SU 103 accesses a memory location in each CU 104 sequentially; address 0 (zero) accesses the first address of VM1 202-1, address 1 (one) the first address of VM2 202-2, address 2 (two) the first address of VM3 202-3, etc. When address 7 (seven) is reached, the SU 103 wraps back to VM1 202-1 and accesses its second address location. As would be apparent the size of the address space at each location can vary depending on the implementation. The memory access using column mode or page mode can be provided concurrently using address bits to determine which type of access (column/slice) that will be utilized to access the shared memory. Alternatively a single address range could be utilized, and register bits can then be used to switch between the two modes.

Figure 5:
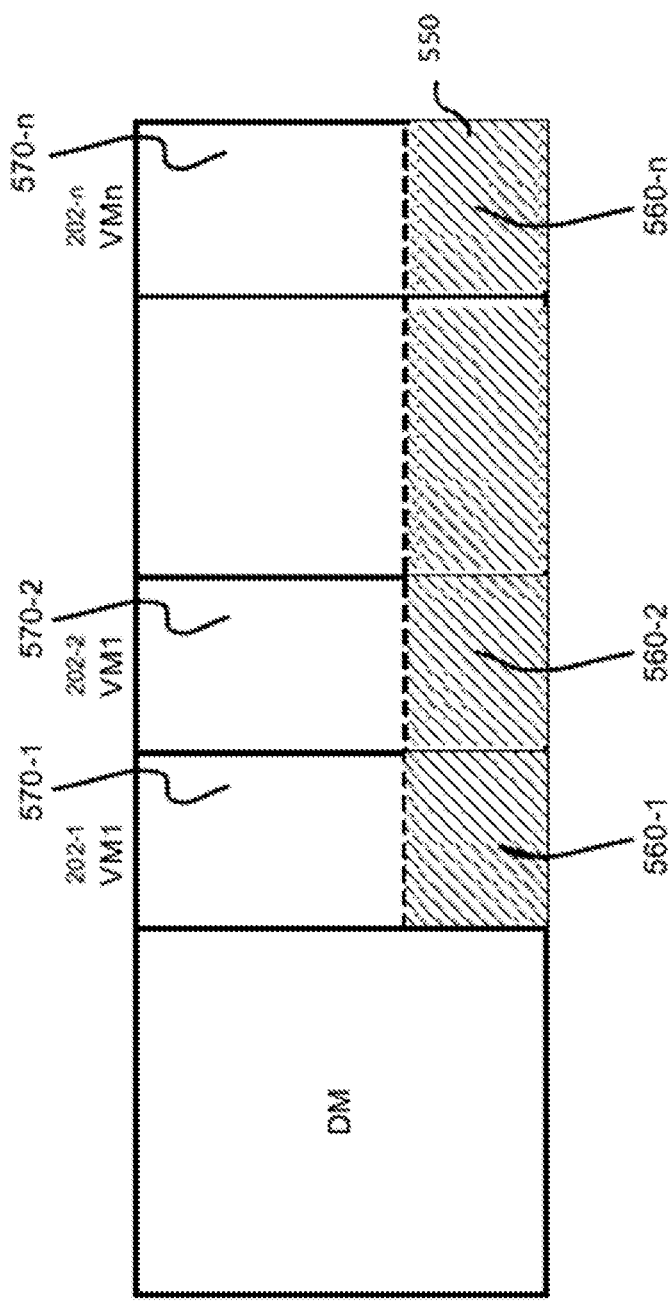
FIG. 5 is an example with only a portion of the VM shared.

Referring to FIG. 5, as another embodiment, only a portion of the vector memory can be shared with the SU 103. A pre-determined threshold 550 is used to limit the available addressing space in the vector memory to reserve vector memory space 560-1 . . . 560-n for the CUs 104. The remaining memory space 570-1 . . . 570-n is accessible to SU 103. The reserved memory can be a fixed range of memory or may be configured by the processor depending on programming requirements. For example depending on the processing requirements of the CUs 104 or SU 103 based on the type of data being processed memory may be reserved for CU processing requirements.

Figure 6:
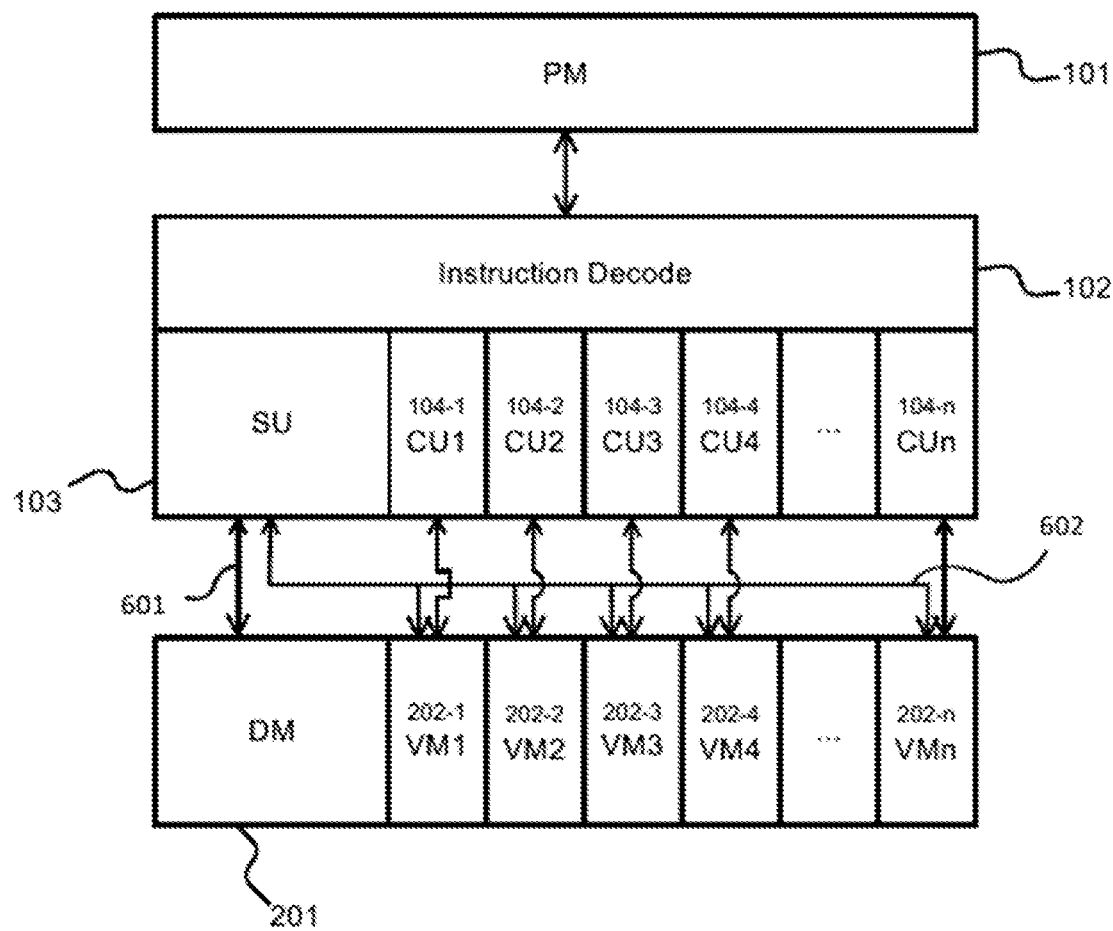
FIG. 6 shows an example where the scalar unit (SU) can access the DM and VM concurrently.
Figure 7:
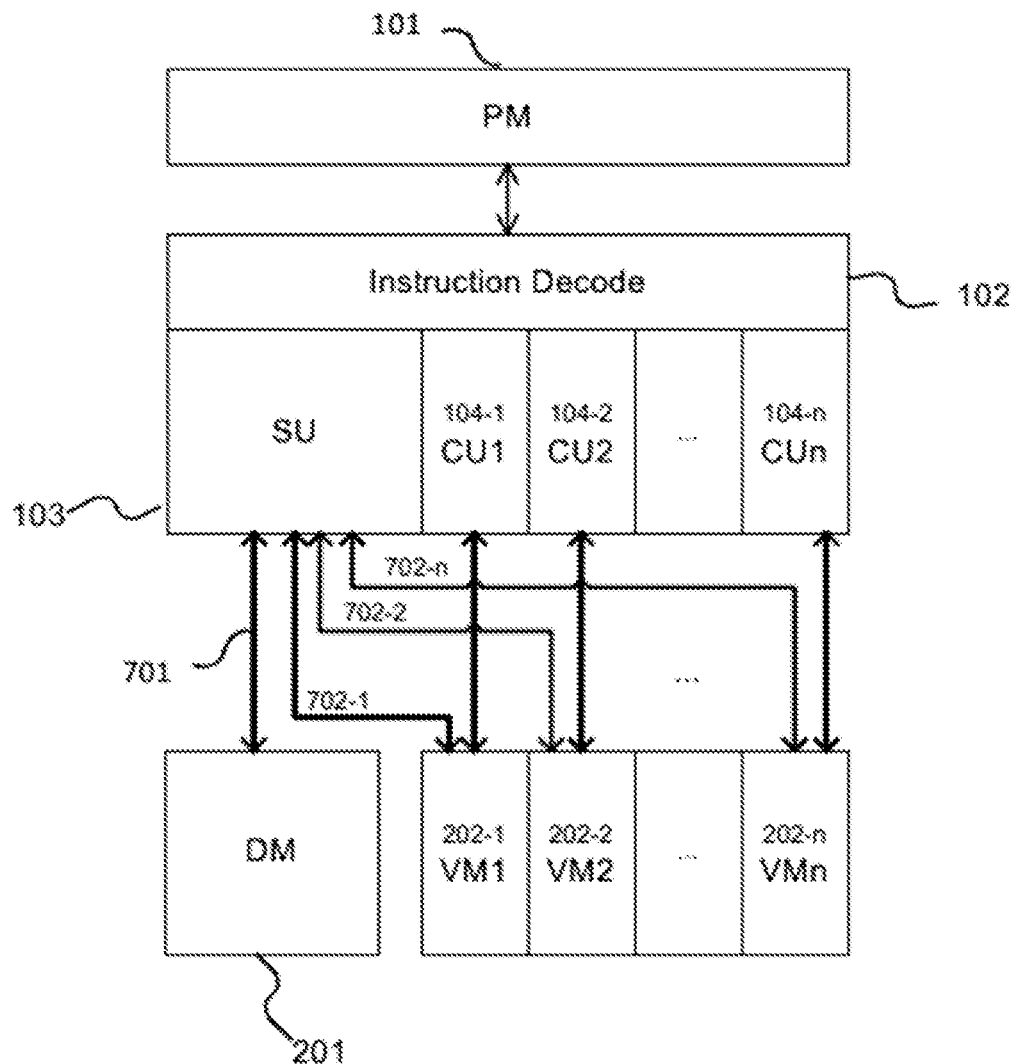
FIG. 7 shows an example where the SU can access the DM and multiple VM concurrently.

Referring to FIG. 6, the SU 103 can use two separate memory ports 601 and 602 to access the DM 201 and the VM 202 concurrently and obtain two values in parallel. Alternatively, the memory may be accessed by a multiplexer configuration to enable selective access. Alternatively, as per FIG. 7, the SU 103 can perform a read via memory ports 702-1.702-n to access each VM 202-1.202-n and DM 201 concurrently. The access of each CU 104 may have a fixed relationship with a block of VM 202. Alternatively the CU 104 may be multiplexed to the VM 202 blocks to enable reallocation of memory locations. Similarly the based upon the interface between the CU 104 and VM 202 the memory access may allocated to different memory locations within the DM 201.

The memory CU memory allocation may be fixed in the processor or alternatively may be configurable on startup of the processor.

Figure 8:
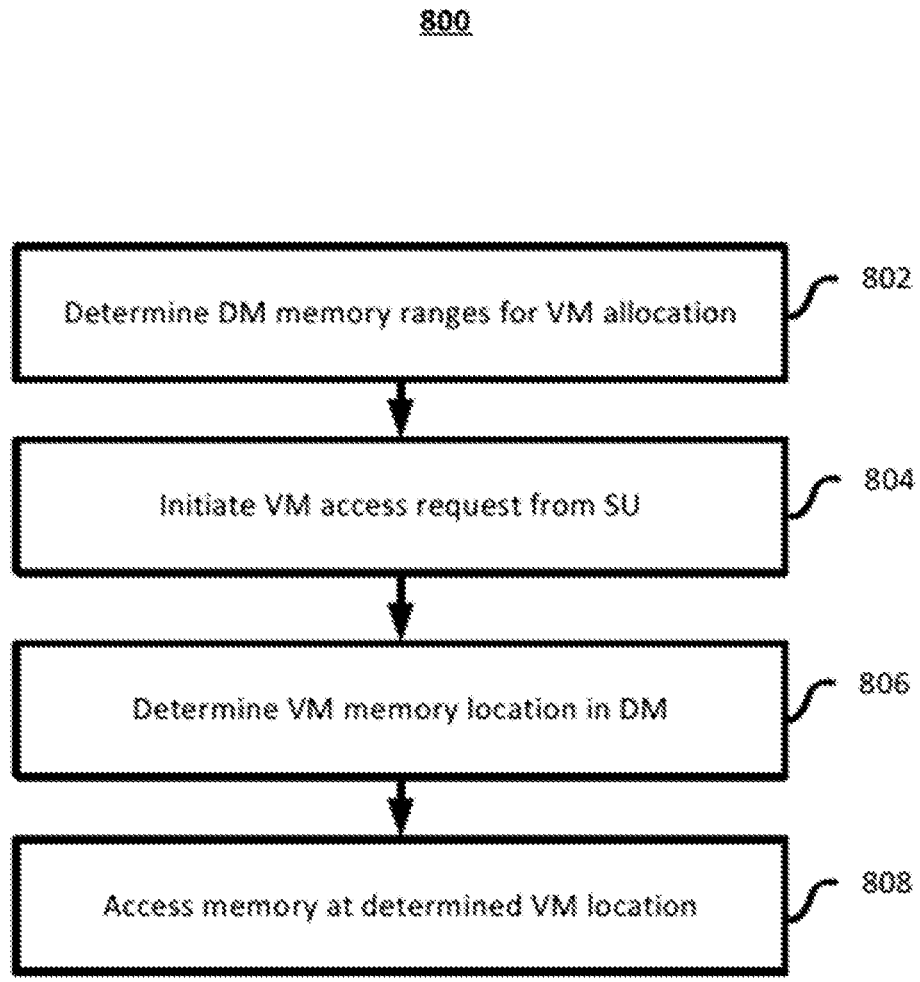
FIG. 8 depicts a method of data memory access in a asymmetrical processor.

FIG. 8 depicts a method of retrieving data using an asymmetrical processor memory architecture. The method 800 determines the DM ranges allocated for VM for each CU (802). The SU initiates a VM access request to a location associated with a CU (804). The associated VM memory addresses in DM is determined (806). The memory can then be accessed from the VM memory location using the determined address (808).

Figure 9:
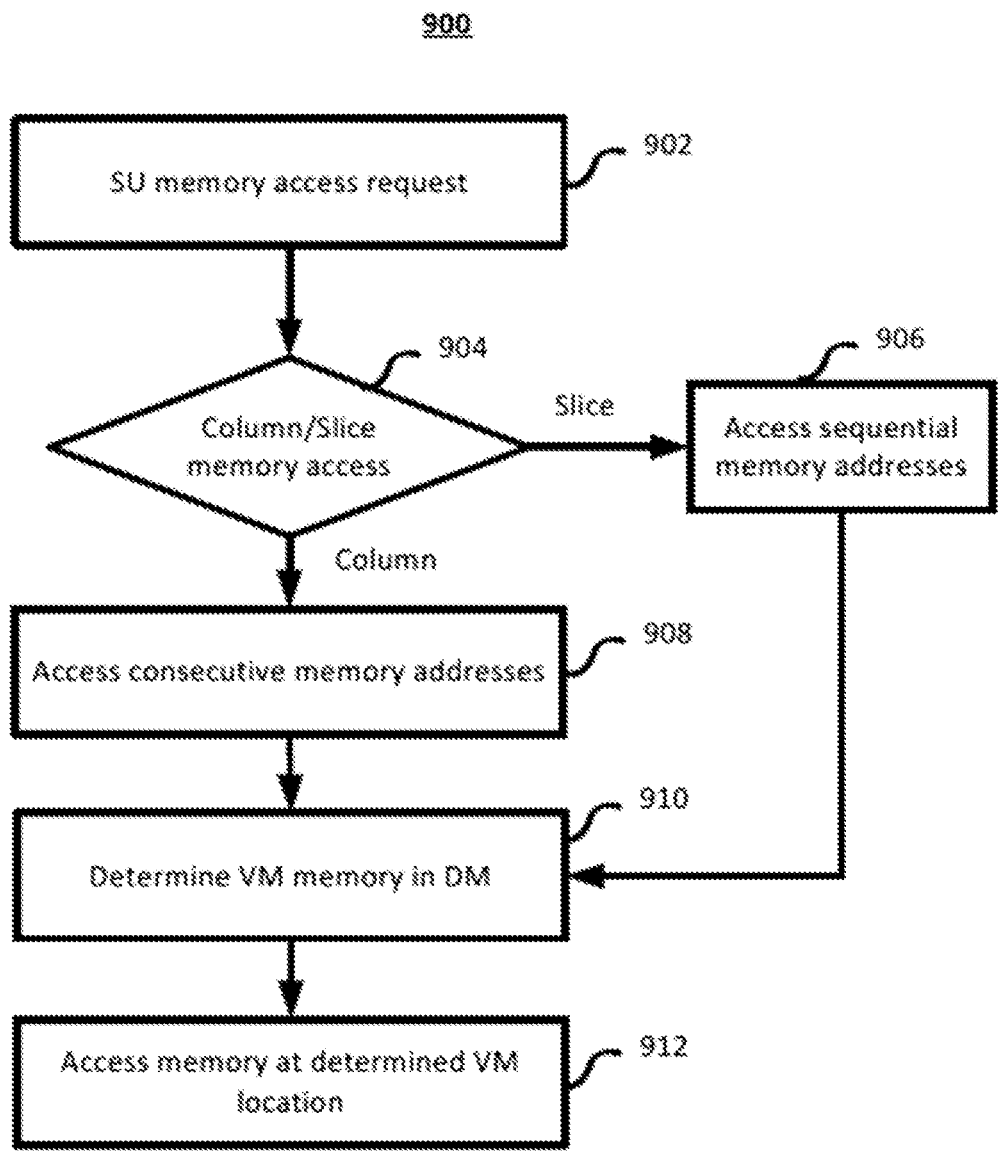
FIG. 9 depicts another method of retrieving data with a using an asymmetrical processor memory architecture.

FIG. 9 depicts another method of retrieving data using an asymmetrical processor memory architecture. The method 900 commences with the SU initiating a VM access request to a location associated with a CU (902). If the memory access is configured in a slice configuration (Slice at 904) memory ranges can be accessed sequentially (906). The associated VM memory addresses in DM is determined (910). The memory is read from the VM memory location using the determined address (912). If the memory access is configured in a column configuration (Column at 904) memory ranges can be accessed consecutively (908). The column memory address can coincide with VM memory addresses associated with particular CUs. The associated VM memory addresses in DM is determined (910). The memory can be access at the VM memory location using the determined address (912).

Figure 10:
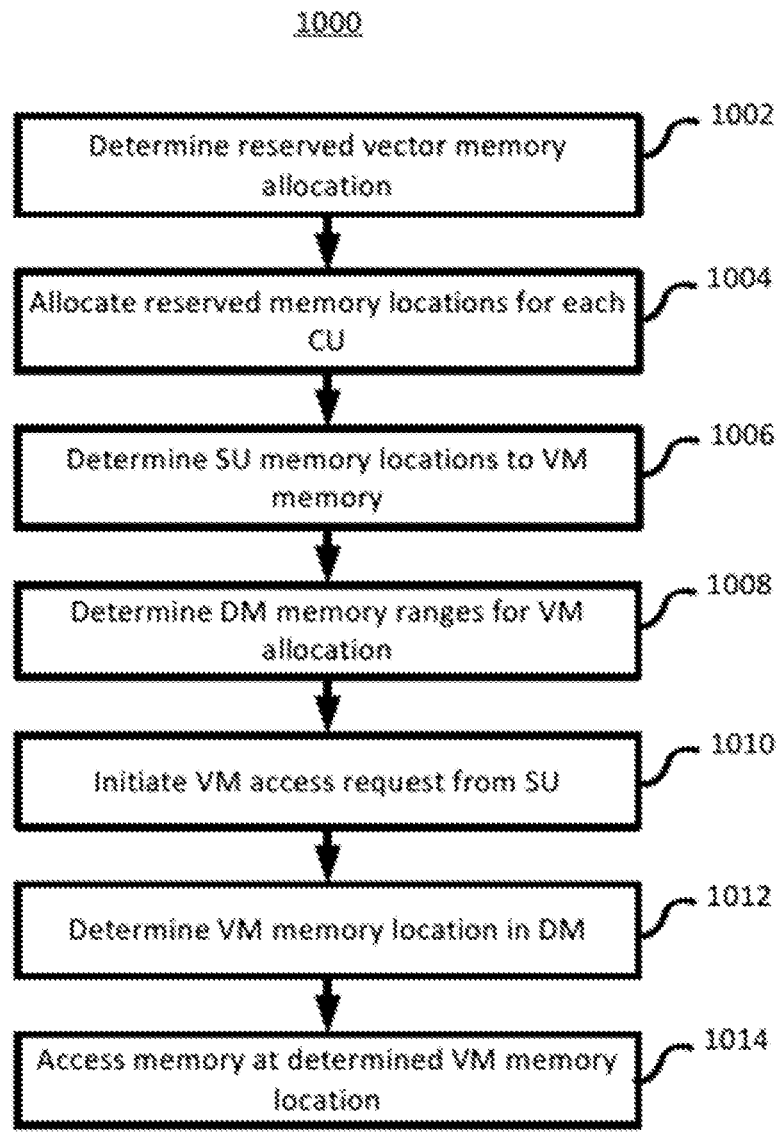
FIG. 10 depicts another method of retrieving data with a using an asymmetrical processor memory architecture having reserved memory allocations.

FIG. 10 depicts another method of retrieving data using an asymmetrical processor memory architecture having reserved memory allocations. The method 1000 commences determining reserved vector memory allocation for the VM locations (1002). The memory may be allocated as a portion of the available VM memory locations (1004). From the allocated portion memory addresses can be determined that are available for the SU (1006). The DM memory ranges can be then be determined for the VM allocation to the SU (1008). A memory access is then initiated by the SU (1010) the associated VM memory addresses in DM is determined (1012). The memory may then be access at the VM memory location using the determined address (1014).

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. An asymmetrical processing system comprising:
   a scalar unit having a single memory port;
   a vector unit comprised of one or more computational units coupled with a vector memory space;
   wherein the vector memory space includes a first memory port coupled to exchange data with the memory port of the scalar unit, and a second memory port coupled to exchange data with the computational units;
   a data memory space having a memory port and contiguous with the vector memory space;
   wherein the memory port of the data memory space is coupled to exchange data with the memory port of the scalar unit; and
   wherein the scalar unit is configured to directly address and exchange data with both the data memory space and the vector memory space through the single memory port of the scalar unit.

2. The processing system according to claim 1, wherein the scalar unit accesses the data memory space and vector memory space concurrently.

3. The processing system according to claim 1, wherein the scalar unit accesses the data memory space and the one or more computational units access the vector memory space concurrently.

4. The processing system according to claim 1, further comprising:
   a program memory space storing instructions for the scalar unit and vector unit; and
   instruction decode logic for decoding an instruction retrieved from the program memory space.

5. The processing system according to claim 4, wherein the scalar unit and the vector unit operate on a decoded instruction in parallel.

6. The processing system according to claim 5, further comprising a configurable memory access mode to determine a slice or a column memory access mode.

7. The processing system according to claim 6, wherein the access mode is determined by access bits or register bits.

8. The processing system according to claim 2, wherein the scalar unit accesses the vector memory in slice mode sequentially across a plurality of vector memory locations each associated with one of the one or more computational units.

9. The processing system according to claim 7, wherein the scalar unit accesses the vector memory consecutively in column mode wherein a vector memory location associated with one of the one or more computational units is accessed.

10. The processing system according to claim 9, wherein the vector memory is divided into a plurality of sub-blocks allowing the scalar unit to access the sub-blocks concurrently.

11. The processing system according to claim 10, wherein only a portion of the vector memory is accessible by the scalar unit.

12. The processing system according to claim 11, wherein the portion of vector memory is defined by a predetermined threshold.

13. The processing system according to claim 12, wherein the scalar unit accesses the data memory space and a plurality of vector memory space concurrently.

14. The processing system according to claim 13, wherein the scalar unit accesses the data memory space, a plurality of vector memory space, and the one or more computational units access the vector memory space.

15. The processing system according to claim 14, wherein the vector memory space is allocated in software.

16. The processing system according to claim 1, wherein the vector memory space is hard coded.

17. The processing system according to claim 15, wherein the memory access method is determined at start up of the processing system.

* * * * *